United States Patent [19]
Kozaki et al.

[11] Patent Number: 4,834,419
[45] Date of Patent: May 30, 1989

[54] HYDRAULIC STABILIZER CONTROL SYSTEM WITH ROAD SURFACE SENSOR

[75] Inventors: Tetsuji Kozaki; Mamoru Shimamoto; Kouichi Moriguchi, all of Nagoya, Japan

[73] Assignee: Nippondenso Co., Ltd., Kariya, Japan

[21] Appl. No.: 108,933

[22] Filed: Oct. 16, 1987

[30] Foreign Application Priority Data

Oct. 16, 1986 [JP] Japan ................. 61-246200

[51] Int. Cl.⁴ ............................................ B60G 11/00
[52] U.S. Cl. ..................................... 280/707; 280/723
[58] Field of Search ................. 280/707, 721, 723; 180/141, 142

[56] References Cited

U.S. PATENT DOCUMENTS

| 4,050,704 | 9/1977 | Duca et al. | 280/6 R |
| 4,595,072 | 6/1986 | Barnea | 180/169 |
| 4,600,215 | 7/1986 | Kuroki et al. | 280/707 |
| 4,613,153 | 9/1986 | Shibahata et al. | 280/689 |
| 4,616,848 | 10/1986 | Sugasawa et al. | 280/707 |
| 4,621,833 | 11/1986 | Soltis | 280/707 |
| 4,625,994 | 12/1986 | Tanaka et al. | 280/707 |
| 4,632,423 | 12/1986 | Tanahashi | 280/689 |
| 4,641,856 | 2/1987 | Reichenbach | 280/772 |
| 4,712,807 | 12/1987 | Kurosawa | 280/707 |

FOREIGN PATENT DOCUMENTS

| 61-64514 | 4/1986 | Japan . | |
| 61-146612 | 7/1986 | Japan . | |
| 2006131 | 5/1979 | United Kingdom | 280/689 |

Primary Examiner—Kenneth R. Rice
Attorney, Agent, or Firm—Cushman, Darby & Cushman

[57] ABSTRACT

In an automotive vehicle having a stabilizer connected to unspring members, a hydraulic stabilizer control system comprises a hydraulic cylinder unit interposed between the stabilizer and at least one of the unspring members; a road surface sensor for detecting a road surface condition, a speed sensor for detecting a speed of said automotive vehicle, and a steering sensor for detecting a steering angle of said automotive vehicle; and a controlling unit for controlling the hydraulic cylinder unit in accordance with outputs from the sensors. A roll of the vehicle is reduced by this hydraulic stabilizer control system even when the vehicle is turning on a rough road.

13 Claims, 7 Drawing Sheets

HYDRAULIC STABILIZER CONTROL SYSTEM WITH ROAD SURFACE SENSOR

BACKGROUND OF THE INVENTION

1. Field of the Invention

The present invention relates generally to a stabilizer for an automotive vehicle, and particularly to a control system for a hydraulic stabilizer.

2. Prior Art

Heretofore, a stabilizer apparatus and a vehicle attitude control system were disclosed in Japanese patent application provisional publications Nos. 61-64514 and 61-146612. In these publications, a hydraulic cylinder unit is coupled to a stabilizer, and roll of a turning vehicle is reduced by controlling an oil pressure supplied to an oil pressure chamber in the hydraulic cylinder unit. When a vehicle is traveling straight, and hydraulic cylinder unit is freely expanded or contracted so that the stabilizer is substantially disconnected from a suspension.

However, the hydraulic cylinder unit is controlled irrespective of the condition of the road surface. Therefore, it is uncomfortable for passengers when the vehicle turns on a rough road or a road with bad surface.

SUMMARY OF THE INVENTION

The present invention has been developed in order to remove the above-described problem inherent in the conventional hydraulic stabilizer control system.

It is, therefore, an object of the present invention to provide a new and useful hydraulic stabilizer control system for automotive vehicles thereby enabling comfortable traveling on a rough road.

According to a feature of the present invention, the hydraulic stabilizer control system comprises a hydraulic cylinder unit interposed between a stabilizer and an unsprung member, such as a shock absorber; first means for controlling oil pressure supplied to the hydraulic cylinder unit; sensor means having a road surface sensor for detecting a road surface condition, a speed sensor for detecting a speed of the automotive vehicle, and a steering sensor for detecting a steering angle of the automotive vehicle steering wheel; and a second means for controlling the first means in accordance with outputs from the sensor means.

BRIEF DESCRIPTION OF THE DRAWINGS

The object and features of the present invention will become more readily apparent from the following detailed description of the preferred embodiments taken in conjunction with the accompanying drawings in which.

The same or corresponding elements and parts are designated at like reference numerals throughout the drawings.

DETAILED DESCRIPTION OF THE INVENTION

Figure 1:
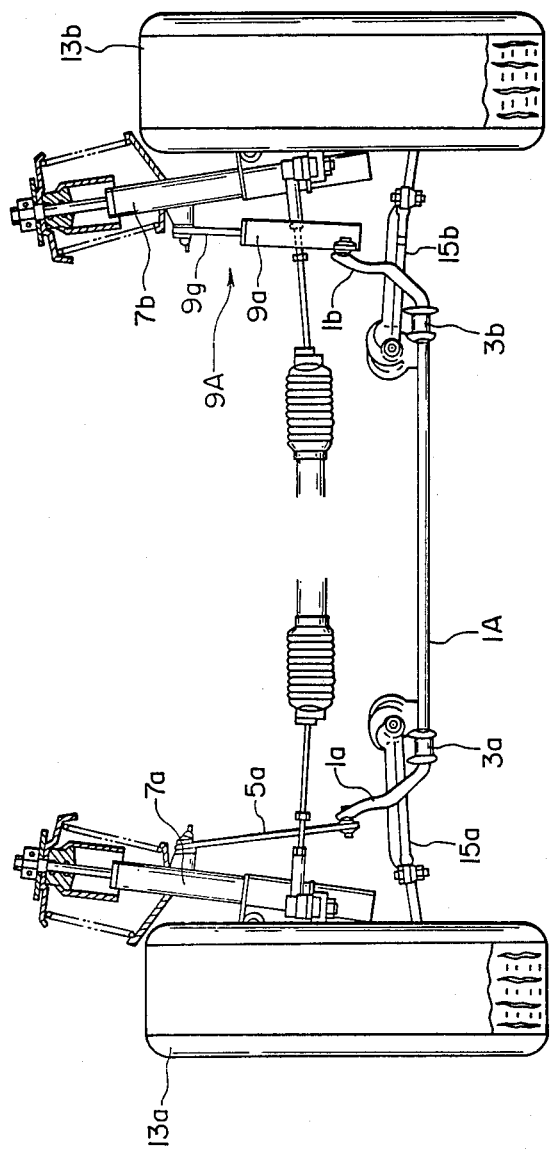
FIG. 1 is a front schematic view showing a lower portion of a vehicle having a hydraulic cylinder unit according to the present invention.

An embodiment of the present invention will be described hereinbelow with reference to the drawings. Referring now to FIG. 1, an automotive vehicle has a front stabilizer 1A rotatably supported on a vehicle body by rubber bearings 3a and 3b. One end 1a of the stabilizer 1A is connected, via a tie rod 5a, to an unsprung member, such as a strut portion 7a of a shock absorber. The other end 1b of the stabilizer 1A is connected to another strut portion 7b via a hydraulic cylinder unit 9A. One front vehicle wheel 13a is connected to the vehicle body via one lower arm 15a and the strut portion 7a, and the other front vehicle wheel 13b is connected to the vehicle body via the other lower arm 15b and the strut portion 7b.

Figure 2:
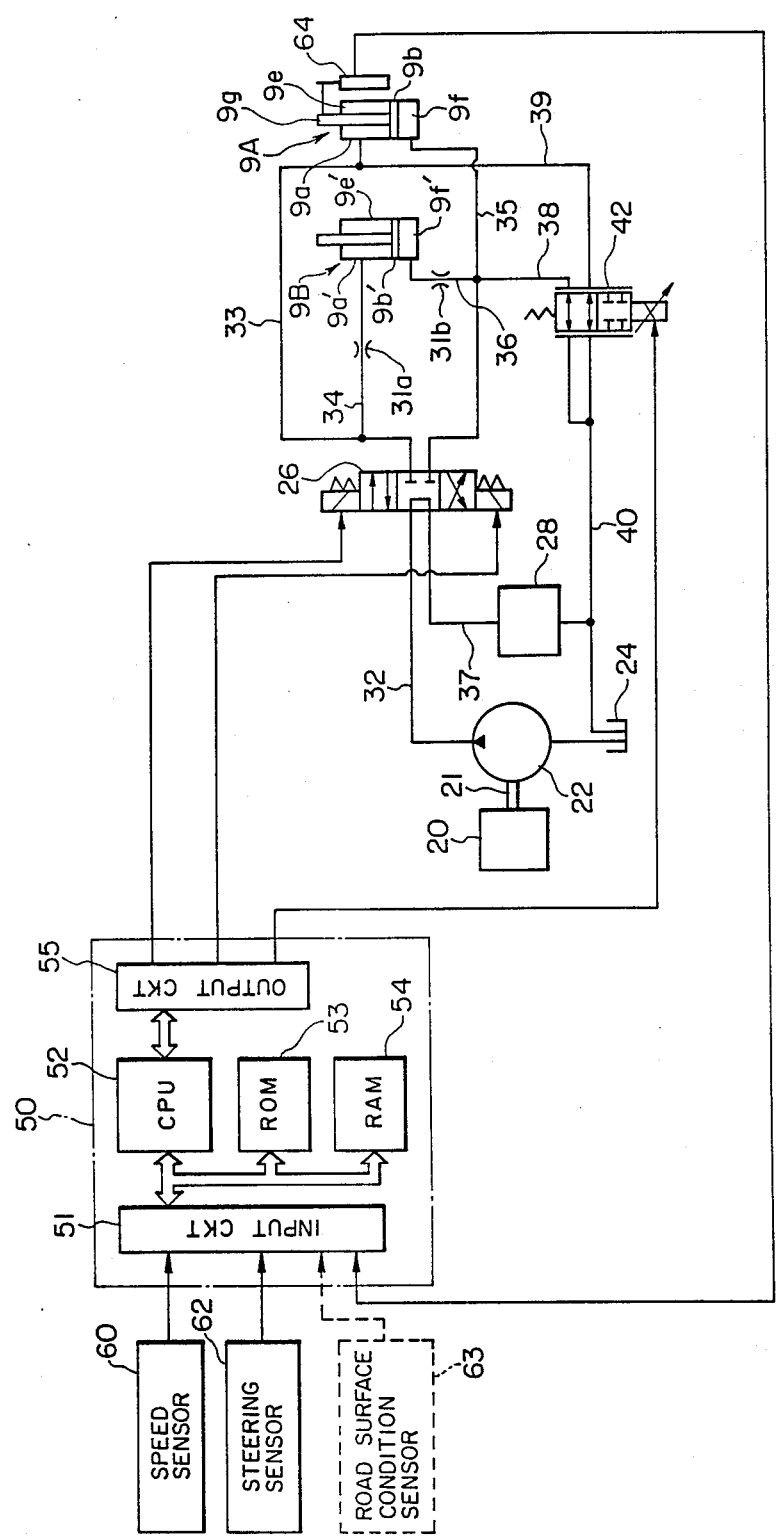
FIG. 2 is a schematic diagram of a hydraulic stabilizer control system according to the invention.

FIG. 2 is a schematic diagram of a hydraulic stabilizer control system of one embodiment according to the invention. The hydraulic cylinder unit 9A has a cylinder 9a slidably accommodating a piston 9b connected with one end of a rod 9g. The interior of the cylinder 9a is divided by the piston 9b into an upper chamber 9e and a lower chamber 9f, and the other end of the rod 9g connected to the strut portion 7b. The cylinder 9a is connected to the end 1b of the stabilizer 1A (see also FIG. 1).

If the piston rod 9g is moved upward relative to the cylinder 9a, the substantial length of the cylinder unit 9A increases and also the distance between the stabilizer end 1b and the strut portion 7b increases. If the piston rod 9g moves downward relative to the cylinder 9a, the substantial length of the cylinder unit 9A decreases and also the distance between the stabilizer end 1b and the strut portion 7b decreases. Since the stabilizer 1A is twisted in accordance with the substantial length between the stabilizer end 1b and the strut portion 7b, the torsional rigidity of the stabilizer 1A depends on the substantial length of the cylinder unit 9A. As will be understood from the above description, the cylinder unit 9A is controlled to adjust the torsional rigidity of the stabilizer 1A. The piston rod 9g may be connected to the stabilizer end 1b. In this case, the cylinder 9a is connected to the strut portion 7b.

The automotive vehicle has a rear stabilizer (not shown) designed in a similar manner to the front stabilizer 1A except for the following point. The rigidity of the rear stabilizer is set normally weaker than that of the front stabilizer. A rear hydraulic cylinder unit 9B has an internal design similar to that of the front cylinder unit 9A, and is connected between the rear stabilizer and a member of a rear unspring member in a similar way to that of the front cylinder unit 9A.

An automotive engine 20 has a crankshaft or an output shaft 21 connected to a hydraulic pump 22 to power the same. The inlet of the hydraulic pump 22 is connected to an oil reservoir 24. The outlet of the hydraulic pump 22 is connected to the front cylinder unit 9A and the rear cylinder unit 9B via conduits or lines 32–36, and via a change-over solenoid valve 26 of the four-port three-position type. The outlet of the hydraulic pump 22 is also connected to a power steering apparatus 28 via the line 32, the change-over valve 26 and another line 37. The upper and lower chambers 9e and 9f of the front cylinder unit 9A are mutually connected via a connection-disconnection solenoid valve 42 of the four-port two-position type, and the upper and lower chambers 9e' and 9f' of the rear cylinder unit 9B are mutually connected via the connection-disconnection solenoid valve 42. The upper and lower chambers 9e, 9e', 9f, and 9f' of the cylinder units 9A and 9B are also connected to the oil reservoir 24 via the connection-disconnection valve 42. As shown in FIG. 2, the lines 34 and 36 directly connected to the rear cylinder unit 9B respectively have chokes 31a, 31b to compensate for the weaker rigidity of the rear stabilizer 1A.

An electronic control unit 50 comprises a microcomputer system having the combination of an input circuit 51, a central processing unit (CPU) 52, a read-only memory (ROM) 53, a random access memory (RAM) 54, and an output circuit 55. The ROM 53 holds a program operating the electronic control unit 50, and the RAM 54 temporarily holds data or signals.

The electronic control unit 50 is electrically connected to the change-over valve 26 and the connection-disconnection valve 42. The change-over valve 26 has three mode positions, i.e. a neutral mode position, an expansion mode position, and a contraction mode position. The connection-disconnection valve 42 has two mode positions, i.e. a connection mode position and a disconnection mode position. The electronic control unit 50 outputs control signals to such solenoid valves 26 and 42, thereby changing their mode positions. A speed sensor 60 for detecting the current speed of the vehicle produces a speed signal, while a steering sensor 62 for detecting the current steering angle of the vehicle produces a steering angle signal. A road surface sensor 63 for detecting the current road surface condition produces a road signal, and a position sensor or a stroke sensor 64 for detecting the current position of the piston 9b produces a position signal. The position sensor 64 may also be used for the road surface sensor 63. The speed signal, the steering signal, the road signal, and the position signal are transmitted to the input circuit 51 in the electronic control unit 50. Then the electronic control unit 50 outputs control signals to the change-over valve 26 and the connection-disconnection valve 42 in accordnace with the the signals from the sensors 60, 62, 63, and 64 by using the program held in the ROM 53.

Now the basic operation of the hydraulic stabilizer control system will be described hereinbelow.

Figure 8:
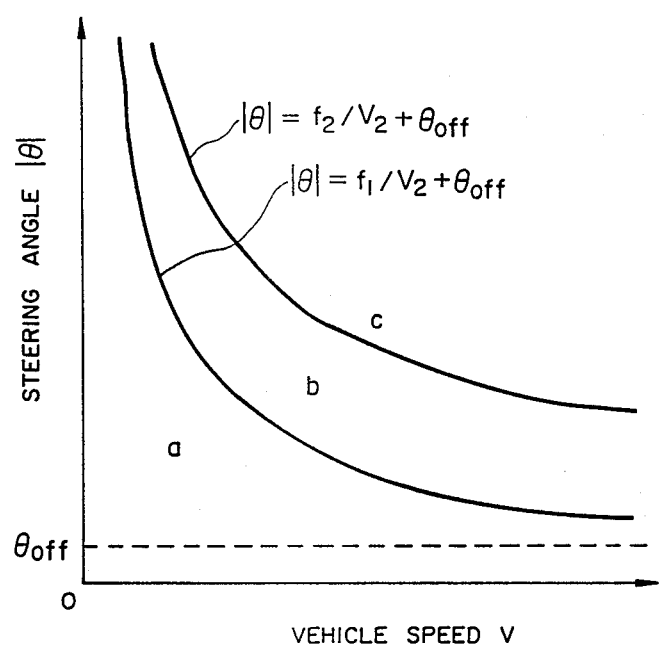
FIG. 8 is a graph showing vehicle speed-steering angle characteristics according to the invention.

Firstly, it will be described in connection with a road having a good surface condition or a paved road. When the vehicle is on a good surface an ordinary stroke control is performed. FIG. 8 is a programmed map or a graph showing vehicle speed-steering angle characteristics exhibiting four ranges: "straight", range "a", range "b" and range "c". Here references $f_1$ and $f_2$ are constants ($f_1 < f_2$), and $\theta_{off}$ is a constant for compensating a backlash angle of the steering of the vehicle. When the steering angle is less than $\theta_{off}$, the vehicle is traveling straight. If the vehicle is traveling straight (steering angle less than $\theta_{off}$), the change-over valve 26 is held in the neutral mode position, and the connection-disconnection valve 42 is held in the connection mode position (OFF state). When the change-over valve 26 is in the neutral mode position, the cylinder units 9A and 9B are disconnected from the hydraulic pump 22, and the power steering apparatus 28 is connected to the hydraulic pump 22 so that the pressurized oil from the hydraulic pump 22 is supplied, via the lines 32 and 37 to the power steering apparatus 28 only. In this case, the power steering apparatus 28 is activated. Meanwhile, when the connection-disconnection valve 42 is in the connection mode position, the upper and lower chambers 9e, 9e', 9f, and 9f' of the cylinder units 9A and 9B communicate with each other via the lines 33–36, 38 and 39 so that the pistons 9b and 9b' are free to move relative to the cylinders 9a and 9a' respectively. More specifically, when the vehicle is traveling straight, the pistons 9b and 9b' freely move in accordance with torsional forces transmitted from the front and rear stabilizers so that the stabilizers are prevented from exhibiting their inherent rigidities and are forced to exhibit only negligible or small effective rigidities. In other words, the stabilizers are disabled.

If the vehicle turns at a small steering angle and at a low vehicle speed (region "a" in FIG. 8), the change-over valve 26 is held in the neutral mode position, and the connection-disconnection valve 42 is changed to the disconnection mode position (ON sate). At this time, the upper and lower chambers 9e, 9e', 9f, and 9f' are disconnected each other so that these chambers are substantially sealed thereby fixing the pistons 9b and 9b' relative to the cylinders 9a and 9a'. More specifically, the pistons 9b and 9b' are respectively fixed in the neutral position S0 where a force affecting one stabilizer from one corresponding cylinder unit is equal to zero. Accordingly, the cylinder units 9A and 9B operate as rigid members connecting the stabilizers and the strut portions, so that the stabilizers are allowed to practically exhibit their inherent rigidities. Thus, a roll of the vehicle is effectively reduced or prevented.

If the vehicle turns at a large steering angle or at a high vehicle speed (at least region "b" in FIG. 8) the change-over valve 26 is changed to the expansion mode position or the contraction mode position, and the connection-disconnection valve 42 is changed to the disconnection mode position.

When changing to the expansion mode position, the pressurized oil from the hydraulic pump 22 flows into the lower chambers 9f and 9f' via the line 32, 35, and 36, and the connection-disconnection valve 26, and the oil in the upper chambers 9e and 9e' flows into the reservoir 24 via the lines 33, 34, and 37, the connection-disconnection valve 26, and the power steering apparatus 28. When the electronic control unit 50 determines that the piston 9b of the cylinder unit 9A reaches a target expansion position by using the signal from the position sensor 64, the change-over valve 26 is changed to the neutral mode position so that the cylinder units 9A and 9B are substantially fixed in such an expansion condition. When the cylinder unit 9A is substantially expanded, the strut portion 7b is moved upward, and the strut portion 7a is moved downward by the reaction of the stabilizer 1A. These opposite movements of the strut portions 7a and 7b can reduce a roll angle of the vehicle.

When changing to the contraction mode position, the pressurized oil from the hydraulic pump 22 flows into the upper chambers 9e and 9e' via the lines 32, 33, and 34, and the connection-disconnection valve 26, and the oil in the lower chambers 9f and 9f' flows into the reservoir 24 via the lines 35, 36, 37 and 40, the connection-disconnection valve 26, and the power steering apparatus 28. When the electronic control unit 50 determines that the piston 9b of the cylinder unit 9A reaches a target contraction position by using the signal from the position sensor 64, the change-over valve 26 is changed to the neutral mode position so that the cylinder units 9A and 9B are substantially fixed in such a contraction condition. When the cylinder units 9A and 9B are substantially contracted, the strut portion 7b is moved downward, and the strut portion 7a is moved upward by the reaction of the stabilizer 1A. These opposite movements of the strut portions 7a and 7b can reduce the roll angle of the vehicle.

Now operation on a road having a rough road or a bad surface condition will be described. If the vehicle is traveling straight (steering angle below $\theta_{off}$ in FIG. 8) or turns at a small steering angle (region "a" in FIG. 8), the change-over valve 26 is held in the neutral mode position, and the connection-disconnection valve 42 is held in the connection mode position in the same manner as the case of the straight travel on the good condition road. Therefore, the stabilizers 1A etc. are disabled as mentioned before.

If the vehicle turns at a large steering angle or turns with a large transverse acceleration (region "b" in FIG. 8) the change-over valve 26 is held in the neutral mode position, and the connection-disconnection valve 42 is temporarily operated in the disconnection mode position as follows.

When the connection-disconnection valve 42 is set in the disconnection mode position, the pistons 9b and 9b' of the cylinder units 9A and 9B are temporarily fixed first thereby preventing a shock accompanied with a rapid supply of the pressurized oil. Then the change-over valve 26 is changed to the expansion mode position or the contraction mode position, and the pressurized oil is supplied to the cylinder units 9A and 9B. After this, when electronic control unit 50 determines that the piston 9b of cylinder unit 9A reaches the neutral mode position S0 by using the signal from the position sensor 64, the change-over valve 26 is held in the neutral mode position so that the stabilizers 1A etc. are allowed to practically exhibit their inherent rigidities. Thus cylinder units 9A and 9B are operated by two processes, i.e. temporarily fixed in an arbitrary position first, and then fixed in the neutral mode position so that the roll of the vehicle is effectively reduced or prevented even when the turning vehicle is traveling on the rough road.

If the vehicle turns at a further larger steering angle or turns with a further transverse acceleration (region "c" in FIG. 8) the change-over valve 26 and the connection-disconnection valve 42 are controlled by the same control method as in the case that the expansion mode or the contraction mode is changed to the neutral mode when the road surface is in good condition. Therefore, the roll angle is reduced so that the good traveling condition of the vehicle is obtained.

Now the operation of the electronic control unit 50 will be described hereinbelow.

Firstly, a process for determining the road surface condition will be described. If the connection-disconnection valve 42 is in the connection mode position, the position sensor 64 detects not only the position of the piston 9b of the cylinder unit 9A but also the condition of the road surface. The cylinder unit 9A has positions "S0+s" and "S0−s" separated positions by predetermined equidistance "s", from the neutrale mode position S0. Therefore, if the position sensor 64n S detects on of the pisitions "S0±s", it means that the stroke of a piston or the movement of a piston position S is out of a range "S0±s". Thus, an amplitude of the lower spring members can be obtained by the stroke sensor or the position sensor 64. In addition, assuming that a valve n is the number of times which the amplitude amount is out of the range "S0±s" in a unit time, and that a reference "n0" is a number of predetermined threshold times by the unit time, for example, it is possible to determine whether the road is in a good surface condition or in a bad surface condition by comparing the times "n" with the threshold times "n0".

Figure 3:
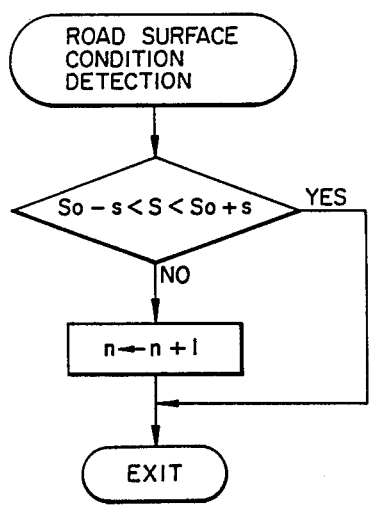
FIG. 3 is a flowchart showing a road surface condition detecting process according to the invention.
Figure 4:
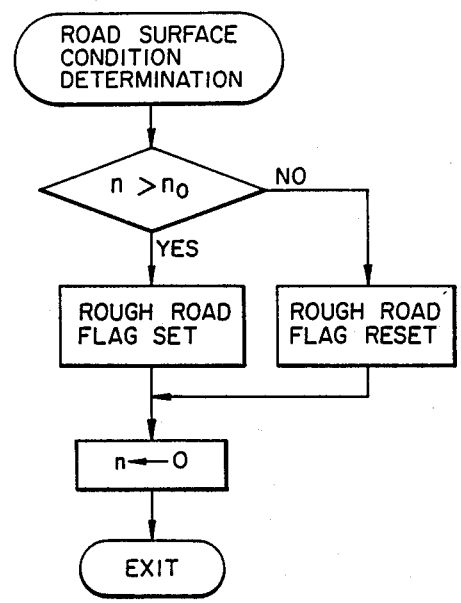
FIG. 4 is a flowchart for a road surface condition determining process according to the invention.
Figure 5:
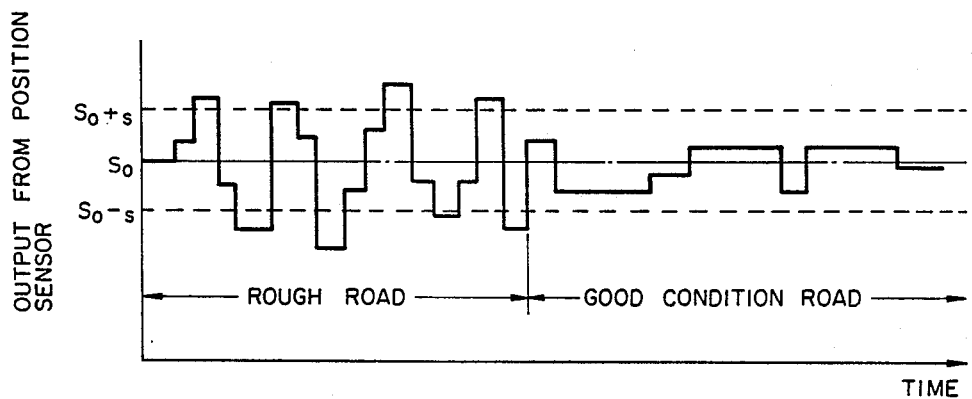
FIG. 5 is a graph showing outputs from a position sensor on a rough road and on a good surface condition road according to the invention.

FIG. 3 is a flowchart of the program of a road surface condition detecting process for detecting the road surface condition and FIG. 4 is a flowchart of the program of a road surface condition determining process for determining the road surface condition. The road surface condition detecting process is executed as an interrupt routine at an interval $t_0$ and the road surface condition determining process is executed as an interrupt routine at an interval $T_0$ ($t_0 < < T_0$, and for example, $t_0 = 10$ msec, $T_0 = 1$ sec). In addition, a road surface condition flag is set or reset by the road condition determining process. FIG. 5 is a diagram showing outputs from the stroke sensor 64. As will be seen from the diagram, when the vehicle is on the rough road or bad surface condition road, the piston movement is out of the range "S0±s", and when the vehicle is on the good surface condition road, the piston movement is within the range "S0±s".

Secondly, a stabilizer control process provided as the main routine of the program will be described hereinbelow.

Figure 6:
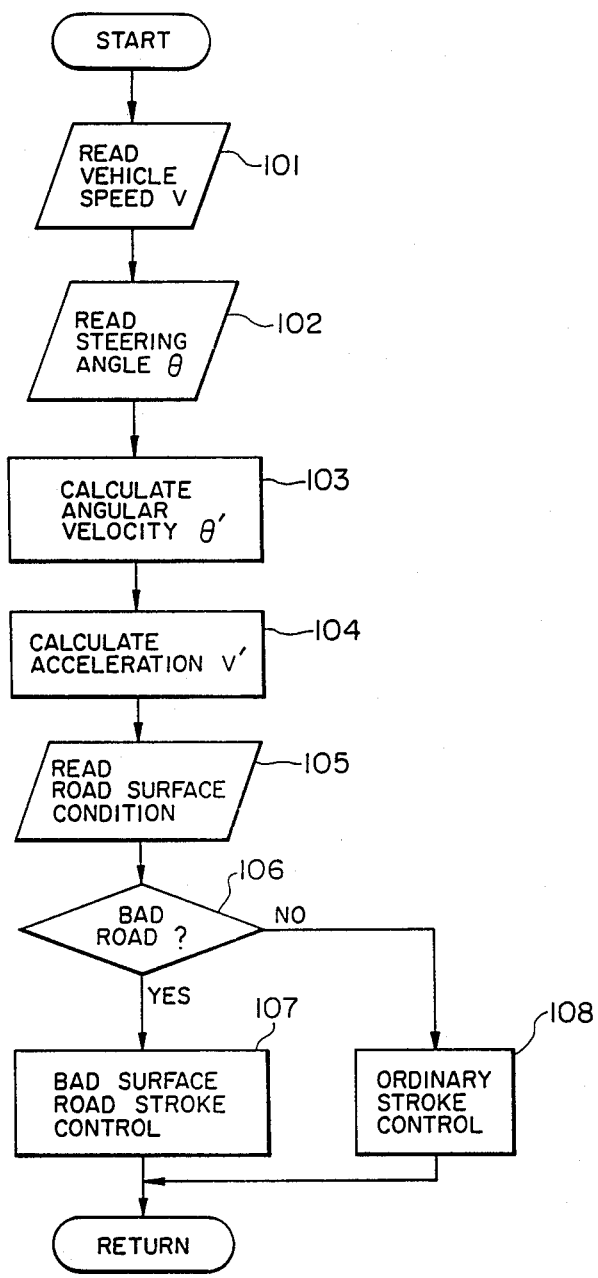
FIG. 6 is a flowchart of a main routine of the program for stabilizer control according to the invention.

FIG. 6 is a flowchart of the program for controlling the stabilizers 1A etc. In a step 101 of the flowchart, the signal of a current vehicle speed V is read from the speed sensor 60. In a step 102 following the step 101, a current steering angle $\theta$ is read from the steering sensor 62. In a step 103 following the step 102, a steering angular velocity $\theta'$ is calculated by using the current steering angle $\theta$. In a step 104 following the step 103, a vehicle acceleration V' is calculated by using the signal of the current vehicle speed V. In a step 105 following the step 104, the road surface condition flag obtained by the road surface condition determining process (see FIG. 4) is read. In a step 106 following the step 105, it is determined that whether or not the road surface condition is bad on the basis of the determination of the above-mentioned road surface condition determining process. When the road surface condition is bad, the program advances to a step 107. When the road surface condition is not bad, the program advances to a step 108. In a step 108, the above-mentioned ordinary stroke control is performed.

Figure 7:
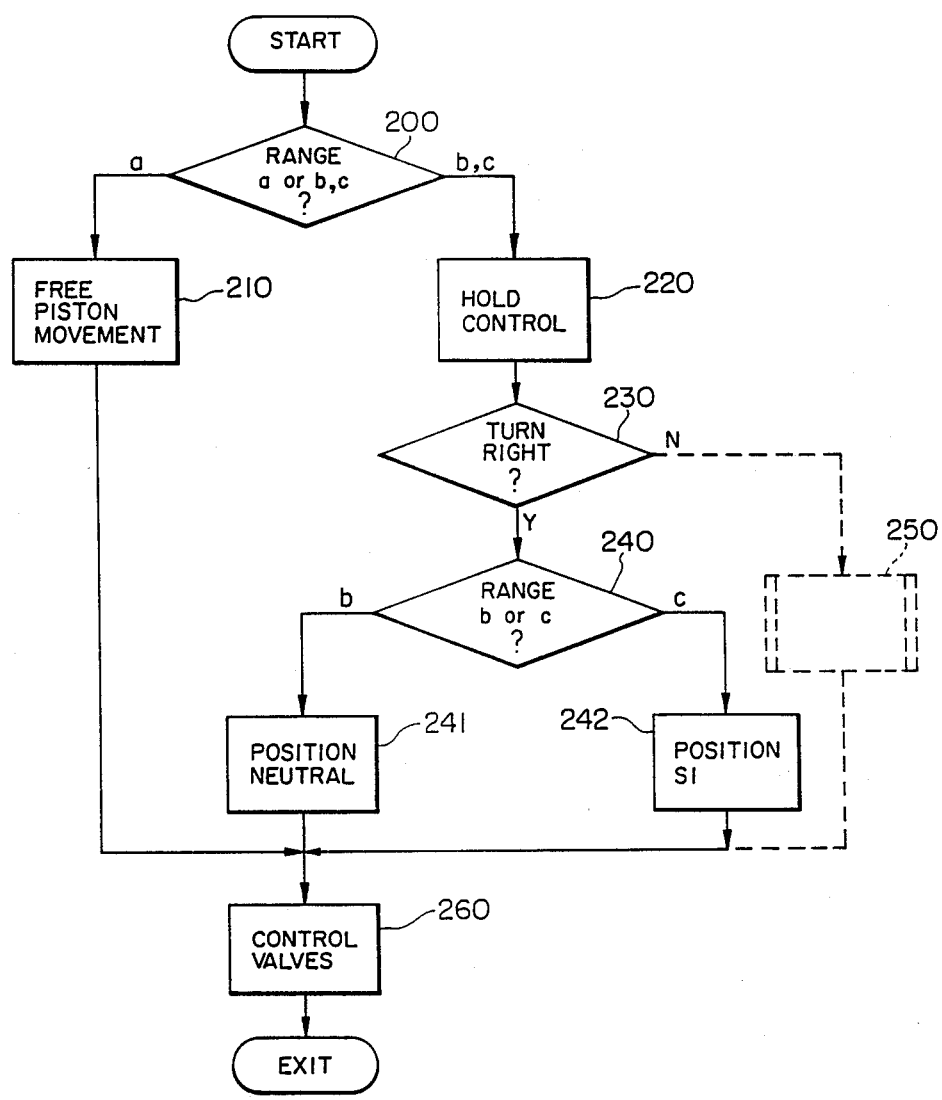
FIG. 7 is a flowchart of a rough road determining process of FIG. 6 according to the first embodiment of the present invention.

The control of the vehicle on a rough road performed in the step 107 will be described with reference to FIGS. 7 and 8. FIG. 7 is a flowchart of the bad surface condition stroke control process of FIG. 6. In a step 200, it is determind that whether the vehicle speed V and the steering angle $|\theta|$ reside in the ranges "a" (including a steering angle less than $\theta_{off}$), "b" or "c" by using the programmed map shown in FIG. 8. When the vehicle speed V and the steering angle $|\theta|$ are in the range "a" or below, i.e. the vehicle is in an essentially straight travel condition or is turning at a small steering angle, the program advances to a step 210. When both the vehicle speec V and the steering angle $|\theta|$ are in the range "b", or "c", i.e. the vehicle is in an essentially turning travel condition, the program advances to a step 220. In the step 210, the pistons 9b and 9b' are set so as to move freely relative to the cylinder units 9A and 9B, so that the stabilizers 1A etc. are disabled (free control). After the step 210, the program advances to a step 260. In the step 220, the change-over valve 26 is set in the neutral mode and the connection-disconnection valve 42 is set in the disconnection mode first (hold control). Therefore, the pistons 9b and 9b' are fixed at this time. Then, in a step 230 following the step 220, it is determined that whether or not the vehicle is turning right on the basis of the steering angle $|\theta|$.

When the vehicle is turning right, the program advances to a step 240. In the step 240 following the step 230, it is determined that whether the vehicle speed V and the steering angle $|\theta|$ reside in the range "b" or in the range "c" by using the programmed map shown in FIG. 8. When the vehicle speed V and the steering angle $|\theta|$ are in the range "b", i.e. the vehicle is turning at a large roll angle by a transverse acceleration, the program advances to a step 241. In the step 241 following the step 240, the pistons 9b and 9b' are set to the neutral position S0. When both the vehicle speed V and the steering angle $|\theta|$ are in the range "c", i.e. the vehicle is turning at a larger roll angle than a predetermined value, the program advances to a step 242. In the step 242 following the step 240, the pistons 9b and 9b' are set to a programmed position S1 where the roll angle of the vehicle is to be reduced. After the step 241 or the step 242, the program advances to the step 260.

When the vehicle is turning left, the program advances to a block 250 provided for a left turn. The block 250 includes steps similar to the steps 240-242 provided for right turn of the vehicle. Here, is a step corresponding to the step 242 in the block 250, the pistons 9b and 9b' are set to a programmed position -S1 to reduce the roll angle of the vehicle.

In the step 260, the changeover valve 26 and the connection-disconnection valve 42 are controlled in accordance with each of conditions or modes to be set. Each duty cycle of the two modes such as the neutral mode (OFF state) and the other modes (ON state) of the change-over valve 26 may be alternately carried out at a desired interval to move the pistons 9b and 9b' step by step to a target position (duty cycle control). Such a duty cycle control is also applied to the connection-disconnection valve 42.

As will be seen from the above, when the vehicle is turning on a rough road, hold control is executed first, and then the hydraulic cylinder units 9A and 9B are further controlled. Therefore, the pistons 9b and 9b' can be moved, without giving an uncomfortable feeling to passengers, to the position which the inherent rigidity of the stabilizers 1A etc. is exhibited.

Figure 9:
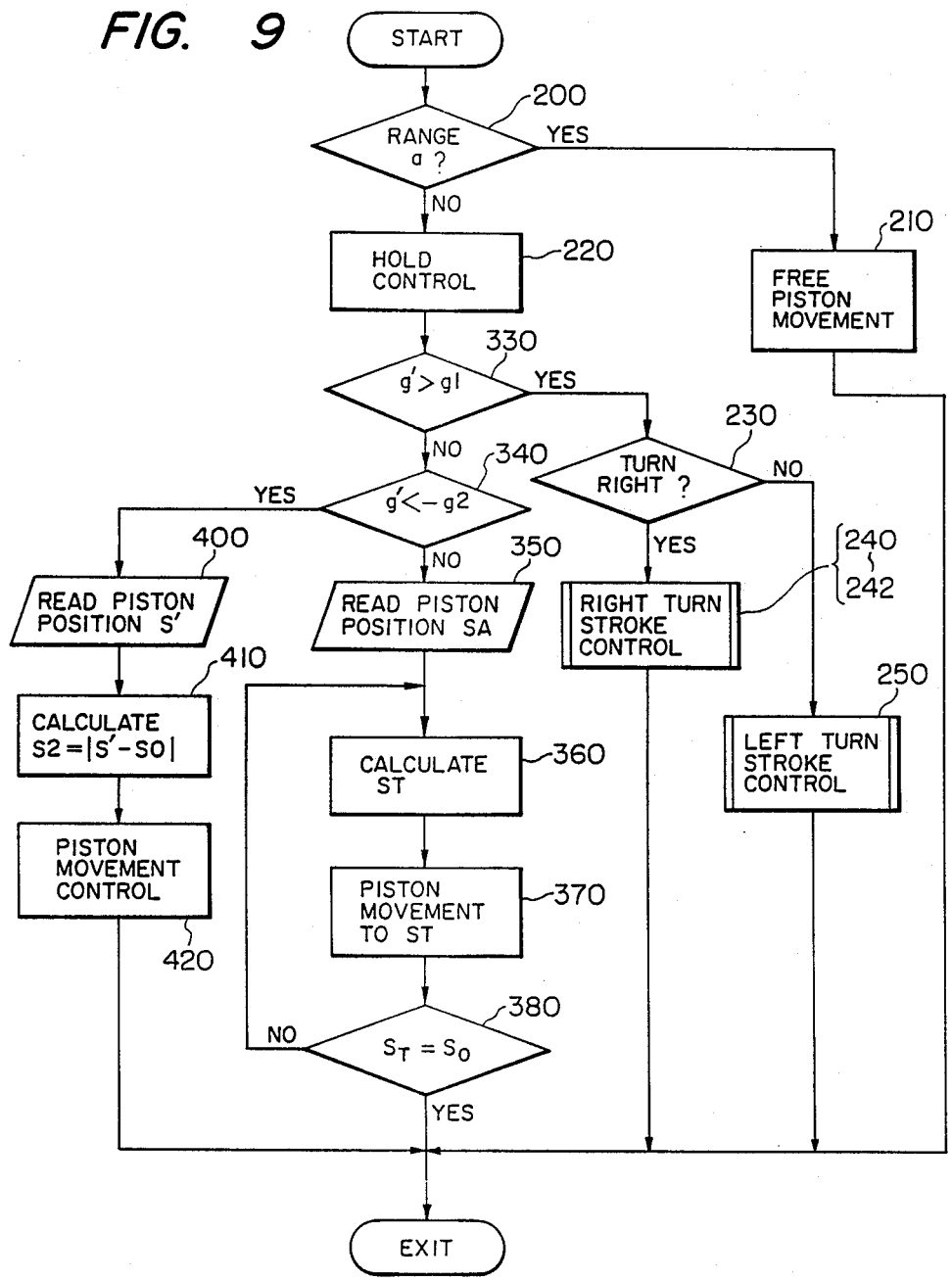
FIG. 9 is a flowchart of a rough road determining process of FIG. 6 according to the second embodiment of the invention.

A second embodiment of control on a rough road will be described hereinbelow with reference to FIG. 9. In FIG. 9, steps labeled with the same reference numerals as those in FIG. 7 are substantially the same as described in connection with FIG. 7, and the further description thereof is omitted.

In this embodiment, a sensor for detecting a transverse acceleration "g" is required in addition to the above-mentioned traveling sensors. After the hydraulic cylinder units 9A and 9B are controlled by the hold control in the step 220, the program advances to a step 330. In the step 330 following the step 220, it is determined whether or not an increase rate "g'" of a transverse acceleration "g" is larger than a predetermined value "$g_1$". If the increase rate "g'" is larger than the predetermined value "$g_1$", vehicle roll is being generated. In this case, the program advances to the step 230, and then the right turn stroke control or the left turn stroke control is executed to reduce the roll of the vehicle.

If the increase rate "g'" is smaller than the predetermined value "$g_1$", the program advances to a step 340. In the step 340 following the step 330, it is determined whether or not the increase rate "g'" is smaller than a predetermined value "$-g_2$" ($g_2$ is a positive value). If the increase rate "g'" is smaller than the predetermined value "$-g_2$", the roll of the vehicle is being decreased. In this case, the program advances to a step 400. In the step 400 following the step 340, the piston position S' in the hold control is read, and the program advances to a step 410. In the step 410 following the step 400, a displacement $S2(=|S'-S0|)$ is calculated. Here, the displacement S2 is the difference between the piston position S' and the neutral piston position S0. Next, the program advances to a step 420. In the step 420 following the step 410, the hydraulic cylinder units 9A and 9B are controlled in accordance with the displacement S2. When the displacement S2 is large, if the solenoid valves 26 and 42 were rapidly controlled, a large shock or a uncomfortable feeling would result from by the rigidity of the stabilizers 1A etc. For this reason, the greater the displacement S2, the larger the number of steps in stepwise control of the cylinder units 9A and 9B. To this end, for instance, the connection-disconnection valve 42 is controlled by the duty cycle control, i.e. valve 42 is controlled by duty cycle signals, such as ON state signals and OFF state signals to the valve 42. Here, ON state duration defined by the ON state signals is linearly reduced with the lapse of time, and each duty cycle of the two modes of the change-over valve 42 is alternately performed. As a result, such a shock by the rigidity of the stabilizers 1A etc. is avoidable.

When the increase rate "g'" is larger than the predetermined value "$-g2$", the vehicle is performing steady turning. Therefore, the roll of the vehicle is essentially constant. In this case, the program advances to a step 350. In the step 350 following the step 340, the piston position SA in the hold control is read. Then, the program advances to a step 360. In the step 360 following the step 350, the first target piston position ST ($=SA--SA/k$) is calculated, and the program advances to a step 370. Here, "k" is a positive constant. In the step 370 following the step 360, the pistons 9b and 9b' within the hydraulic cylinder units 9A and 9B are moved to the first target piston position ST with either expansion or contraction of the cylinder units 9A and 9B, and the program advances to a step 380. In the step 380 following the step 370, it is determined that whether or not the piston position ST becomes equal to the neutral position S0. If the piston position ST does not become equal to the neutral position S0, the program returns to the step 360 and go through again. As a result of such a sequence, the cylinder units 9A and 9B are set to the neutral position S0. Then, the cylinder units 9A and 9B are held in connection condition, i.e. operate as rigid members connecting to the stabilizers 1A etc. and the strut portions 7b etc. so that the stabilizers 1A etc. are allowed to practically exhibit their inherent rigidities.

As will be understood from the above description, if the vehicle is on a rough road determined by the electronic control unit 50 by using signals from sensor means, the electronic control unit 50 outputs the control signals to means, i.e. the solenoid valves 26 and 42 for controlling oil pressures in the cylinder units 9A and 9B. Then, the hydraulic cylinder units 9A and 9B are set in the disconnection condition. At this time, if a roll calculated by using signals from the sensors 60 and 62 is larger than a predetermined value, the substantial length of hydraulic cylinder units 9A and 9B are adjusted to a desired length after the hydraulic cylinder units 9A and 9B is temporarily held in the connection condition. Accordingly, the roll of the vehicle is reduced, and the good traveling condition of the vehicle is obtained.

In the above-mentioned embodiments according to the present invention, although the stroke sensor or position sensor 64 is used as the road surface sensor 63, a sensor for detecting acceleration or vibrations of the body or the wheels of the vehicle may also be used as the sensor means. In this case, the road surface condition may be determined by detecting a condition of the pitching of the vehicle body, or by detecting a change of the rotational acceleration of the vehicle wheel to which the driving force from the engine 20 is not transmitted.

Beside, in the above-mentioned embodiments according to the present invention, although the degree of the roll angle is calculated by referring the signal of the current vehicle speed V and the current steering angle $\theta$, the transverse acceleration detected by an acceleration sensor may be directly utilized without any calculation. In addition, the source of the oil may be independent of the power steering aparatus.

The above-described embodiments are just examples of the present invention, and therefore, it will be apparent for those skilled in the art that many modifications and variations may be made without departing from the scope of the present invention.

It is also to be understood that the following claims are intended to cover all of the generic and specific features of the invention herein described and all statements of the scopes of the invention which, as a matter of language, might be said to fall therebetween.

What is claimed is:

1. A stabilizer control system for a vehicle having a body, right and left unsprung members and right and left wheels connected to said right and left unsprung members, respectively, comprising:
    (a) stabilizer means, connected between said right and left unsprung members, and having an inherent rigidity for reducing rolling of said vehicle;
    (b) actuator means for selectively disabling said stabilizer means to prevent said inherent rigidity of said stabilizer means from influencing said vehicle so that said right and left unsprung members move freely, and for selectively connecting said stabilizer means to said unsprung members so that said inherent rigidity reduces rolling of said vehicle;
    (c) means for detecting the turning condition of said vehicle;
    (d) means for detecting a rough road condition; and
    (e) means for: (1) commanding said actuator means to disable said stabilizer means when said turning detecting means detects essentially straight travel and said road detecting means detects road that is not rough; (2) commanding said actuator means to connect said stabilizer means to reduce the roll of the vehicle when said turning detecting means detects less than a predetermined smooth road that condition and said road detecting means detects road that is not rough; and (3) commanding said actuator means to disable said stabilizer means when said turning detecting means detects either essentially straight travel or less than a predetermined rough road turning condition and said road detecting means detects rough road.

2. The stabilizer control system as claimed in claim 1, wherein said actuator means further comprises:
    a hydraulic cylinder unit having first and second chambers, interposed between said stabilizer means and one of said unsprung members; and
    hydraulic control means for selectively interconnecting said chambers of said hydraulic cylinder unit to allow free expansion and contraction so as to disable said stabilizer means, and for selectively disconnecting said chambers of said hydraulic cylinder unit to fix the length thereof so as to connect said stabilizer means to exhibit its inherent rigidity.

3. The stabilizer control system as claimed in claim 2, wherein said rough road detecting means comprises:
    sensing means for detecting movement of a portion of said hydraulic cylinder unit caused by the expansion and the contraction of said hydraulic cylinder unit; and
    determining means for determining the rough road condition in accordance with said detected movement of said hydraulic cylinder unit.

4. The stabilizer control system as claimed in claim 3, wherein said determining means counts the number of detected movements greater than a predetermined threshold per unit time, and determines the rough road condition when the number is larger than a predetermined value.

5. The stabilizer control system as claimed in claim 2, wherein said commanding means also temporarily commands said hydraulic control means to disconnect said chambers of said hydraulic cylinder unit to fix the hydraulic cylinder unit when said turning detecting means detects greater than said predetermined rough road turning condition and said road detecting means detects rough road.

6. The stabilizer control system as claimed in claim 5, further comprising:
    means for generating pressurized hydraulic fluid;
    means for expanding and contracting the length of said hydraulic cylinder unit when one of said chamabers of said hydraulic cylinder unit is supplied said pressurized fluid; and
    said commanding means also commands said expanding and contracting means to expand and contract said hydraulic cylinder unit to reach a neutral position of said hydraulic cylinder unit after said hydraulic cylinder unit has been temporarily fixed when said turning detecting means detects greater than said predetermined rough road turning condition and said road detecting means detects rough road.

7. The stabilizer control system as claimed in claim 6, wherein said commanding means also commands said expanding and contracting means to expand and contract said hydraulic cylinder unit to reach a target for reducing the roll of the vehicle when said turning detecting means detects greater than another predetermined rough road turning condition and said road detecting means detects rough road, said another predetermined rough road turning condition being greater than said predetermined rough road turning condition.

8. The stabilizer control system as claimed in claim 1, wherein said turning detecting means comprises:
  means for detecting the speed of said vehicle;
  means for detecting the steering angle of a steering wheel; and
  means for calculating said turning condition of said vehicle in accordance with the detected vehicle speed and the detected steering angle.

9. The stabilizer control system as claimed in claim 1, wherein said commanding means also temporarily commands said actuator means to connect such stabilizer means when said turning detecting means detects greater than said predetermined rough road turning condition and said road detecting means detects rough road.

10. A hydraulic stabilizer control system for a vehicle having a body, right and left unsprung members and right and left wheels connected to said right and left unsprung members, respectively, comprising:
  (a) a stabilizer coupled between said right and left unsprung members;
  (b) means for generating pressurized hydraulic fluid;
  (c) a hydraulic cylinder unit having first and second chambers, interposed between said stabilizer and one of said unsprung members;
  (d) hydraulic control means for: (1) selectively interconnecting said chambers of said hydraulic cylinder unit to allow free expansion and contraction of said chambers; (2) selectively disconnecting said chambers of said hydraulic cylinder unit to fix the length thereof; and (3) selectively expanding and contracting the length thereof when said cylinder unit is supplied with said pressurized fluid;
  (e) means for determining a roll amount of said vehicle;
  (f) means for detecting a rough road condition; and
  (g) means for: (1) commanding said hydraulic control means to supply the pressurized fluid to said hydraulic cylinder unit to reduce the roll of the vehicle when the roll amount of said vehicle determined by said roll determining means is larger than a predetermined smooth road threshold value and said road detecting means detects that the road condition is not rough; and (2) temporarily commanding said hydraulic control means to disconnect said chambers of said hydraulic cylinder unit, and then to supply the pressurized fluid to said hydraulic cylinder unit to move said hydraulic cylinder unit to a determined length when the roll amount of said vehicle determined by said roll determining means is larger than a predetermined rough road threshold value and said road condition detecting means detects rough road.

11. The hydraulic stabilizer control system as claimed in claim 10, wherein said determining means comprises:
  means for detecting the speed of said vehicle;
  means for detecting the steering angle of a steering wheel; and
  means for calculating the roll amount of said vehicle in accordance with the detected speed and the detected steering angle.

12. A hydraulic stabilizer control system for a vehicle having a body, right and left unsprung members and right and left wheels connected to said right and left unsprung members, respectively, comprising:
  (a) a stabilizer connected between right and left unsprung members;
  (b) a hydraulic cylinder unit having first and second chambers, interposed between said stabilizer and one of said unsprung members;
  (c) hydraulic control means for selectively interconnecting the chambers of the hydraulic cylinder unit to allow said chambers to freely expand and contract in response to independent movements to right and left unsprung members caused by road vibrations;
  (d) sensing means for detecting movement caused by expansion and contraction of the hydraulic cylinder unit;
  (e) determining means for determining a rough road condition in accordance with said detected movement; and
  (f) control means for commanding the hydraulic control means to interconnect the chambers of the hydraulic cylinder unit, thereby producing free expansion and contraction of the cylinder unit when the vehicle is traveling on a rough road as determined by said determining means.

13. The stabilizer control system as claimed in claim 12, wherein said determining means counts the number of detected movements greater than a predetermined threshold per unit time, and determines the rough road condition when the number is larger than a predetermined value.

* * * * *